(12) United States Patent
Bandi et al.

(10) Patent No.: US 12,344,193 B2
(45) Date of Patent: Jul. 1, 2025

(54) WEARABLE VIRTUAL KEYS FOR VEHICLE ACCESS

(71) Applicant: Ford Global Technologies, LLC, Dearborn, MI (US)

(72) Inventors: Krishna Bandi, Farmington Hills, MI (US); Sathyanarayana Chary Palakonda, Northville, MI (US); Swetha Shailendra, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 328 days.

(21) Appl. No.: 18/145,555

(22) Filed: Dec. 22, 2022

(65) Prior Publication Data

US 2024/0208462 A1 Jun. 27, 2024

(51) Int. Cl.
*B60R 25/24* (2013.01)
*B60R 25/04* (2013.01)
*B60R 25/10* (2013.01)
*B60R 25/30* (2013.01)
*B60R 25/31* (2013.01)

(52) U.S. Cl.
CPC ............ *B60R 25/241* (2013.01); *B60R 25/04* (2013.01); *B60R 25/10* (2013.01); *B60R 25/305* (2013.01); *B60R 25/31* (2013.01)

(58) Field of Classification Search
CPC ....... B60R 25/241; B60R 25/04; B60R 25/10; B60R 25/305; B60R 25/31; B60R 2325/205; B60R 25/24; B60R 25/25; H04W 12/71; H04W 12/065; H04W 12/068; H04W 12/08; H04W 12/72; H04W 12/07; G07C 9/00309; G07C 9/00563
See application file for complete search history.

(56) References Cited

U.S. PATENT DOCUMENTS 6,891,467 B2 * 5/2005 Perttunen ............... B60R 25/241
340/5.82
9,870,665 B2 1/2018 Maiwand et al.
10,074,223 B2 * 9/2018 Newman ............ G07C 9/00309
(Continued)

OTHER PUBLICATIONS

S. Agrawal et al. "Federated Learning for Intrusion Detection System: Concepts, Challenges and Future Directions" (Jun. 2021).
(Continued)

*Primary Examiner* — Nay Tun
(74) *Attorney, Agent, or Firm* — Joseph Zane; Eversheds Sutherland (US) LLP (57) ABSTRACT

A method for managing vehicle access is disclosed. The method may include obtaining a request to access a vehicle from a first user device. The method may further include determining whether the first user device is a user device registered with the vehicle. Responsive to determining that the first user device is unregistered, the method may include transmitting a first authentication request to a second user device. The second user device may be a user device registered with the vehicle. The method may further include obtaining a first authentication response from the second user device in response to first authentication request transmission. The method may additionally include outputting a first control signal to a first vehicle unit based on the first authentication response.

15 Claims, 5 Drawing Sheets

(56) References Cited

U.S. PATENT DOCUMENTS

| | | | |
|---|---|---|---|
| 10,534,819 B2 | 1/2020 | Ricci | |
| 10,654,448 B2 | 5/2020 | Etonye | |
| 2004/0039909 A1* | 2/2004 | Cheng | G07C 9/22 |
| | | | 713/169 |
| 2004/0217850 A1* | 11/2004 | Perttunen | B60R 25/257 |
| | | | 340/5.2 |
| 2009/0284359 A1* | 11/2009 | Huang | B60R 25/24 |
| | | | 340/5.2 |
| 2017/0048224 A1* | 2/2017 | Teraoka | H04W 12/06 |
| 2017/0151930 A1 | 6/2017 | Boesen | |
| 2018/0204399 A1* | 7/2018 | Newman | G07C 9/28 |
| 2018/0247037 A1* | 8/2018 | Weller | G06F 21/32 |
| 2019/0005445 A1* | 1/2019 | Bahrainwala | G06Q 10/0833 |
| 2019/0077368 A1* | 3/2019 | Hwang | B60R 25/24 |
| 2019/0375373 A1* | 12/2019 | Pepe | H04M 1/724098 |
| 2023/0067674 A1* | 3/2023 | Lee | H04W 12/06 |
| 2023/0101560 A1* | 3/2023 | Ghamsari | B60R 25/01 |
| | | | 340/5.72 |

OTHER PUBLICATIONS

M. Aloqaily et al. "An Intrusion Detection System for Connected Vehicles in Smart Cities" (Feb. 2019).

\* cited by examiner

WEARABLE VIRTUAL KEYS FOR VEHICLE ACCESS

TECHNICAL FIELD

The present disclosure relates to a system and method of providing access to a vehicle, and more particularly, to a system and method for providing vehicle access to users by using two-factor authentication process using virtual keys in mobile and wearable devices.

BACKGROUND

Many modern vehicles include pass-entry-passive-start (PEPS) systems that eliminate the need for a mechanical key to unlock vehicle door or to start vehicle engine. An example of a conventional PEPS system is a key fob. Another example of the PEPS system is a phone-as-a-key (PaaK) system that involves the use of a smartphone to unlock the vehicle door and/or the start the vehicle engine.

The PaaK system facilitates accessing vehicle functions traditionally associated with the key fob via a PaaK application ("app") that may execute on the smartphone. The smartphone executing the PaaK app communicates with vehicles via a wireless network and enables a smartphone user to access the vehicle functions.

While the PaaK system enhances user convenience, the PaaK system may be vulnerable to hacking or malicious use. For example, an unauthorized person may attempt to access the vehicle by hacking the PaaK system.

Thus, there is a need for a PaaK system that may prevent unauthorized users from accessing vehicles.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure describes a vehicle access system for managing vehicle access. The system may enable authorized users or user devices to access a vehicle. The vehicle may incorporate a Phone-as-a-key (PaaK) system to support passive-entry-passive-start (PEPS) vehicle operation. The system may store identifiers (e.g., hardware identifiers or MAC addresses) of registered mobile devices that may be authorized to access vehicle functions. For example, the system may store an identifier of a vehicle owner mobile device as a registered or a whitelisted user device identifier. When the system receives a vehicle access request from a user device, the system may obtain user device identifier and determine whether the user device is registered with the vehicle using the user device identifier. The system may provide access to the vehicle functions (e.g., open vehicle doors and/or switch ON vehicle engine) when the user device is registered with the vehicle. On the other hand, the system may execute a two-factor authentication process when the user device is unregistered.

In some aspects, the system may send a first authentication request to the vehicle owner mobile device (or any other registered mobile device) when the system determines that the user device requesting the vehicle access is unregistered. The first authentication request may include the user device identifier. The vehicle owner may approve or reject the first authentication request based on the user device identifier.

The system may enable a first level vehicle access when the vehicle owner approves the first authentication request. The first level vehicle access may be associated with unlocking of vehicle door(s).

In additional aspects, the system may send a second authentication request to the vehicle owner mobile device when a user associated with the user device enters the vehicle (response to vehicle door opening) or when the vehicle owner rejects the first authentication request. The second authentication request may include user images that the system may obtain by using vehicle interior or exterior cameras. The vehicle owner may approve or reject the second authentication request by viewing the user images.

The system may enable a second level vehicle access when the vehicle owner approves the second authentication request and the user associated with the user device is inside the vehicle. The second level vehicle access may include access to a vehicle engine or switching ON of the vehicle engine. In additional aspects, the system may enable the first level vehicle access and the second vehicle access when the vehicle owner approves the second authentication request and the user associated with the user device is outside the vehicle (e.g., located in vehicle proximity).

On the other hand, the system may activate one or more vehicle security features/units when the vehicle owner rejects the second authentication request. The vehicle security features/units may include a vehicle alarm system, transmission of user images to authorities (e.g., police), and/or the like.

The present disclosure provides a vehicle access system that prevents unauthorized users from accessing a vehicle. The system implements two-factor authentication that enhances vehicle security, and ensures that a malicious user may not enter the vehicle and/or switch ON the vehicle engine without authorization from the vehicle owner (or any other registered vehicle user). Further, the system uses existing vehicle components/units to provide two-factor authentication and does not require installation of additional or external components/units.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

Figure 1:
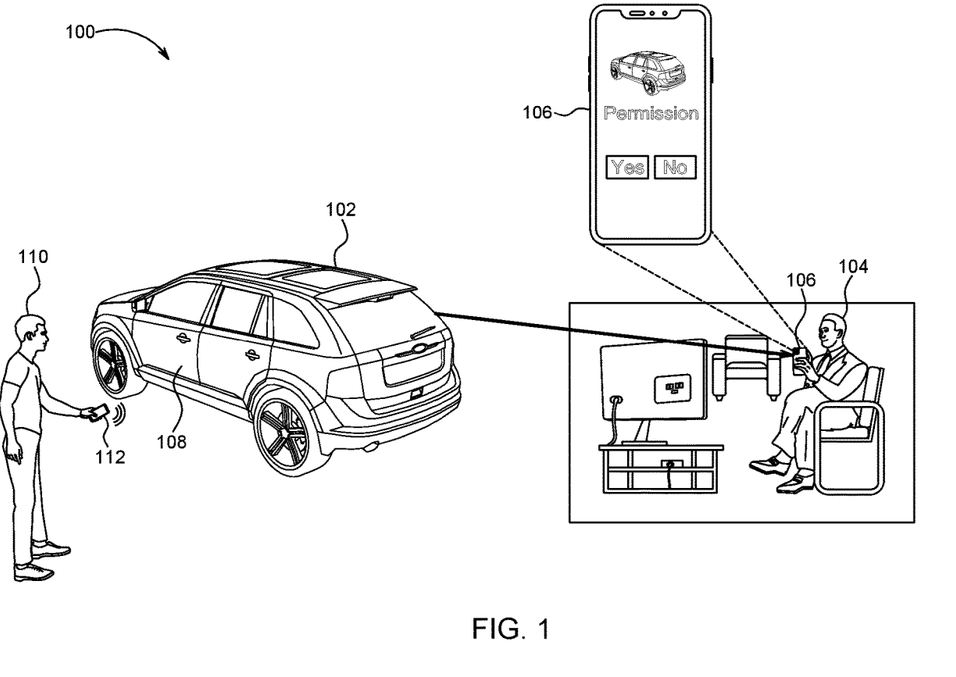
FIG. 1 depicts an example environment in which techniques and structures for providing the systems and methods disclosed herein may be implemented.

FIG. 1 depicts an example environment 100 in which techniques and structures for providing the systems and methods disclosed herein may be implemented. The environment 100 may include a vehicle 102 that may be configured with or incorporate a Phone-as-a-key (PaaK) system to support passive-entry-passive-start (PEPS) vehicle operation. The vehicle 102 may take the form of any passenger or commercial vehicle such as, for example, a car, a work vehicle, a crossover vehicle, a van, a minivan, a taxi, a bus, etc. Further, the vehicle 102 may be a manually driven vehicle, and/or may be configured to operate in a fully autonomous (e.g., driverless) mode or a partially autonomous mode, and may include any powertrain such as, for example, a gasoline engine, one or more electrically actuated motor(s), a hybrid system, etc.

The environment 100 may further include a first user 104 (or a user 104) having a first user device 106 (or a user device 106). The user 104 may be a vehicle 102 owner, and the user device 106 may be a registered user device with the vehicle 102. In some aspects, the user 104 may be present at a location that may be remote from the vehicle 102, as shown in FIG. 1. For example, the user 104 may be present at user home, office, or any other similar location.

The user 104 may execute a PaaK application ("app") installed on the user device 106 and access vehicle 102 functions via a wireless network (not shown in FIG. 1). For example, the user 104 may execute the PaaK app to unlock a vehicle door 108 and/or start a vehicle engine (not shown), when the user 104 desires to operate the vehicle 102. The user 104 may additionally control various vehicle units, e.g., vehicle lights, heating, ventilation, and air conditioning (HVAC) system, infotainment system, etc. (not shown), via the PaaK app.

In some aspects, the vehicle 102 may pre-store a user device 106 identifier in a vehicle memory (not shown) that may be configured to store identifiers of "whitelisted" or registered user devices that may access the vehicle 102 functions. Specifically, the user 104 may register the user device 106 on the vehicle 102 via the PaaK app, when the user 104 accesses the vehicle 102 for the first time by using the user device 106. During user device registration process, the vehicle 102 and the user device 106 may exchange authentication tokens via the wireless network, and the vehicle 102 may obtain the user device 106 identifier. The user device 106 identifier may be a user device 106 hardware identifier or a user device 106 media access control (MAC) address. In addition, the vehicle 102 may obtain a user device 106 contact number, e.g., a cellular phone number, when the user 104 registers the user device 106.

Responsive to the user device 106 being registered with the vehicle 102, the vehicle 102 may store the user device 106 identifier and the contact number in the vehicle memory as whitelisted/registered user device identifier and contact number. In addition, the vehicle 102 may provide (or the user 104 may set) an authentication password/passcode associated with the user device 106 and the vehicle 102, during (or any time after) the user device registration process.

In some aspects, the user 104 may be required to input the authentication password on the PaaK app whenever the user 104 attempts to access the vehicle 102 functions, after registering the user device 106 with the vehicle 102. In other aspects, the user 104 may not be required to input the authentication password on the PaaK app to access the vehicle 102 functions. In the latter case, the vehicle 102 may provide access of the vehicle 102 functions to the user 104 whenever the user 104 accesses the vehicle 102 by using a registered device (e.g., the user device 106), without requiring inputting the authentication password.

In some aspects, the user 104 may set user preferences for accessing the vehicle 102 functions, when (or after) the user 104 registers the user device 106 with the vehicle 102. For example, the user 104 may enable or disable password authentication feature as part of the user preferences.

In additional aspects, the vehicle 102 may obtain user 104 personal identifiable biometric information to provide additional biometric security/authentication for vehicle 102 access. For example, the vehicle 102 may obtain user 104 facial features, fingerprint, iris identification information, voice signature, etc. from the user 104. The vehicle 102 may obtain the user 104 personal identifiable biometric information by using vehicle interior cameras or microphones, user device 106 camera or microphone, and/or any other similar means. Responsive to obtaining the user 104 personal identifiable biometric information, the vehicle 102 may store the information in the vehicle memory.

Similar to enabling or disabling the password authentication feature, the user 104 may enable or disable biometric authentication feature on the vehicle 102 as part of the user preferences.

When the user 104 enables the biometric authentication feature, the vehicle 102 may capture user 104 image and/or voice samples by using the vehicle cameras/microphones whenever the user 104 attempts to access the vehicle 102 (e.g., attempts to start the vehicle ignition). The vehicle 102 may perform biometric authentication by comparing the captured user 104 image/voice sample with the stored user 104 personal identifiable biometric information. The vehicle 102 may provide access to the vehicle 102 functions when the captured user 104 image/voice sample matches with the stored biometric information.

The environment 100 may further include a second user 110 having a second user device 112. The second user device 112 may be a user device that may or may not be registered with the vehicle 102. The second user 110 may attempt to access the vehicle 102 via a PaaK app installed on the second user device 112. In some aspects, the PaaK app installed on the second user device 112 may be same as the PaaK app installed on the first user device 106.

The second user 110 may send a vehicle access request to the vehicle 102 by using the PaaK app installed on the second user device 112. In some aspects, the vehicle 102 may obtain a second user device 112 identifier and a second user device 112 contact number (e.g., a cellular phone number), when the second user device 112 sends the vehicle access request to the vehicle 102. The second user device 112 identifier may be a second user device 112 hardware identifier and/or a MAC address.

Responsive to receiving the second user device 112 identifier (and the second user device 112 contact number), the vehicle 102 may determine whether the second user device 112 identifier matches with the registered/whitelisted user device identifier(s) stored in the vehicle memory. Stated another way, the vehicle 102 may determine whether the second user device 112 is a registered user device. The vehicle 102 may provide vehicle 102 access to the second user 110 when the second user device 112 identifier matches with the stored registered/whitelisted user device identifier.

On the other hand, the vehicle 102 may send an authentication request (e.g., a first authentication request) to the first user device 106 when the second user device 112 identifier does not match with the registered/whitelisted user device identifier(s) stored in the vehicle memory. In this case, the first authentication request may include the second user device 112 identifier and/or the second user device 112 contact number.

Responsive to receiving the first authentication request on the first user device 106, the first user 104 may approve or reject the first authentication request by viewing the second user device 112 identifier and/or the contact number. The vehicle 102 may provide a first level vehicle 102 access to the second user 110 when the first user 104 approves the first authentication request. The first level vehicle 102 access may include, for example, access to a vehicle 102 interior portion by automatically opening the vehicle door 108. Stated another way, when the first user 104 approves the first authentication request, the vehicle 102 may unlock the vehicle door 108.

In some aspects, the vehicle 102 may send another (a second) authentication request to the first user device 106 when the second user 110 enters the vehicle 102 interior portion. The second authentication request may be for providing a second level vehicle 102 access to the second user 110. The second level vehicle 102 access may include, for example, providing access to or switching ON the vehicle engine. In some aspects, the second authentication request may include a second user 110 image that the vehicle 102 may capture via the vehicle interior cameras.

Responsive to receiving the second authentication request including the second user 110 image on the first user device 106, the first user 104 may approve or reject the second authentication request by viewing the second user 110 image. The vehicle 102 may provide the second level vehicle 102 access to the second user 110 when the first user 104 approves the second authentication request. On the other hand, the vehicle 102 may enable/activate one or more vehicle 102 security features/systems when the first user 104 rejects the second authentication request. The vehicle 102 security features/systems may include, for example, vehicle 102 alarm system, transmission of the second user 110 image to authorities (e.g., police), and/or the like.

In an alternative aspect, when the first user 104 rejects the first authentication request and the second user 110 stills attempts to access the vehicle 102 (e.g., by coming close to/in vicinity of the vehicle 102), the vehicle 102 may capture the second user 110 image by using vehicle exterior cameras and enable the vehicle 102 security features/systems or send the second user 110 image to the first user device 106 for further authentication.

A person ordinarily skilled in the art may appreciate from the description above that the present disclosure provides enhanced vehicle security features that allow vehicle access to authorized users only. For example, by using two-factor authentication process (e.g., by using the first and the second authentication requests), the vehicle 102 may prevent unauthorized or malicious users from entering the vehicle 102 and/or from switching ON the vehicle engine.

The detailed process of providing vehicle access to authorized users may be understood in conjunction with subsequent figures.

Figure 2:
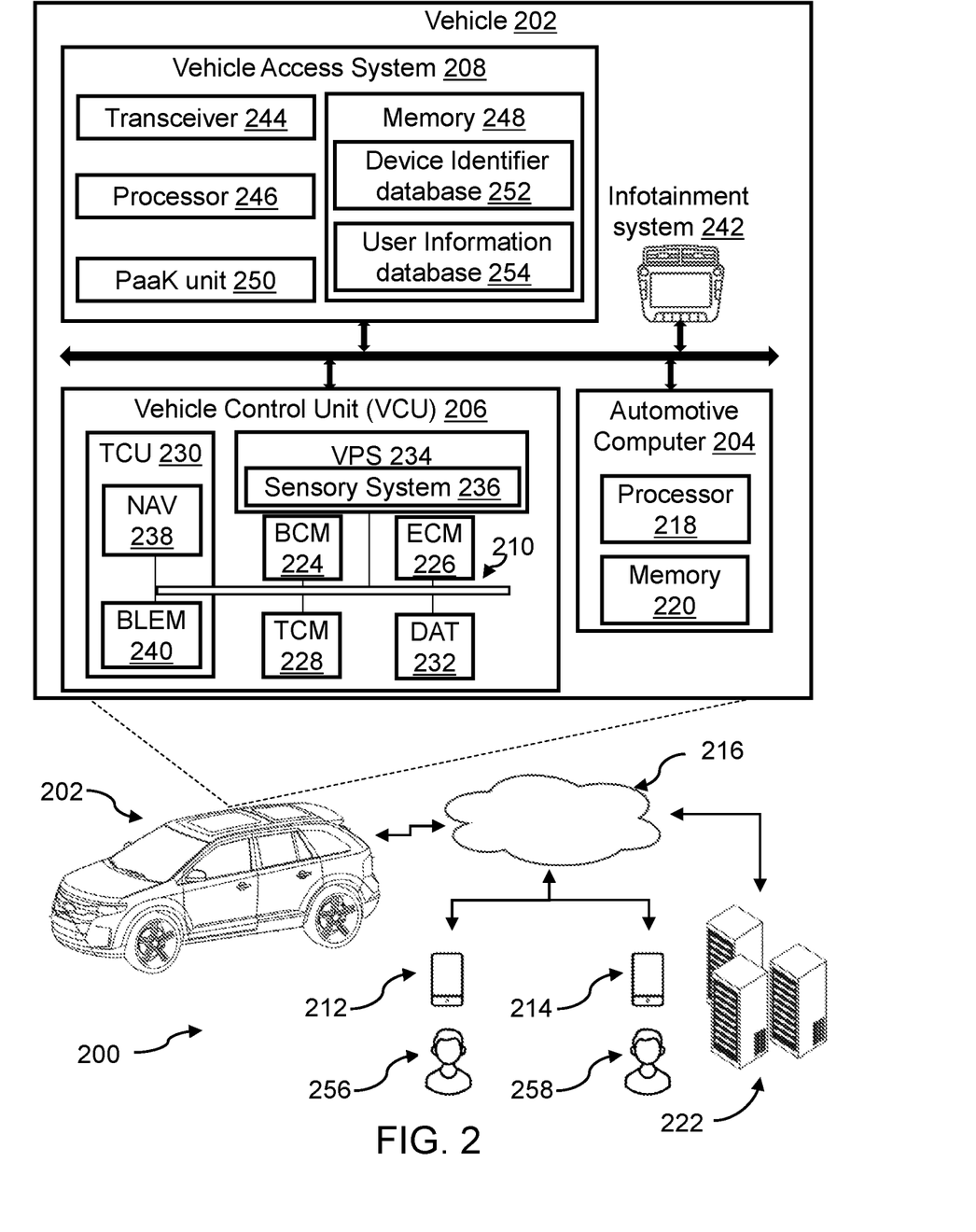
FIG. 2 depicts a block diagram of an example system to manage vehicle access, in accordance with the present disclosure.

FIG. 2 depicts a block diagram of an example system 200 to manage vehicle access, in accordance with the present disclosure. While describing FIG. 2, references may be made to FIG. 3.

The system 200 may include a vehicle 202, which may be same as the vehicle 102. The vehicle 202 may include an automotive computer 204, a Vehicle Control Unit (VCU) 206, and a vehicle access system 208. The VCU 206 may include a plurality of Electronic Control Units (ECUs) 210 disposed in communication with the automotive computer 204 and/or the vehicle access system 208.

The system 200 may further include a first mobile device 212 and a second mobile device 214 that may connect with the automotive computer 204 and/or the vehicle access system 208 by using wired and/or wireless communication protocols and transceivers. The first mobile device 212 may associated with a user 256 (who may be a vehicle 202 owner). The first mobile device 212 may be same as the first user device 106, and the user 256 may be same as the first user 104. In some aspects, the first mobile device 212 may be registered with the vehicle 202. Further, the second mobile device 214 may be same as the second user device 112. In some aspects, the second mobile device 214 may not be registered with the vehicle 202.

Each mobile device 212, 214 may execute the PaaK app that may be installed on respective mobile devices to access vehicle 202 functions, as described in conjunction with FIG. 1. Each mobile device 212, 214 may be, for example, a mobile phone or a smartphone, a tablet, a smartwatch, a laptop, a computer, a wearable communication device or any other similar device with wired/wireless communication capabilities. The mobile devices 212, 214 may communicatively couple with the vehicle 202 via one or more network(s) 216, which may communicate via one or more wireless connection(s), and/or may connect with the vehicle 202 directly by using near field communication (NFC) protocols, Bluetooth ® protocols, Wi-Fi, Ultra-Wide Band (UWB), and other possible data connection and sharing techniques.

The network(s) 216 illustrates an example communication infrastructure in which the connected devices discussed in various embodiments of this disclosure may communicate. The network(s) 216 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

In some aspects, the automotive computer 204 and/or the vehicle access system 208 may be installed in a vehicle engine compartment (or elsewhere in the vehicle 202), in accordance with the disclosure. Further, the automotive computer 204 may operate as a functional part of the vehicle access system 208. The automotive computer 204 may be or include an electronic vehicle controller, having one or more processor(s) 218 and a memory 220. Moreover, the vehicle access system 208 may be separate from the automotive computer 204 (as shown in FIG. 2) or may be integrated as part of the automotive computer 204.

The processor(s) 218 may be disposed in communication with one or more memory devices disposed in communication with the respective computing systems (e.g., the memory 220 and/or one or more external databases not shown in FIG. 2). The processor(s) 218 may utilize the memory 220 to store programs in code and/or to store data for performing aspects in accordance with the disclosure.

The memory 220 may be a non-transitory computer-readable memory storing a vehicle access program code. The memory 220 can include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

In some aspects, the automotive computer 204 and/or the vehicle access system 208 may be disposed in communication with one or more server(s) 222, and the mobile devices 212, 214. The server(s) 222 may be part of a cloud-based computing infrastructure and may be associated with and/or include a Telematics Service Delivery Network (SDN) that provides digital data services to the vehicle 202 and other vehicles (not shown in FIG. 2) that may be part of a vehicle fleet. In some aspects, the server 222 may host the PaaK app that may be installed on the mobile devices 212, 214. In further aspects, the server 222 may store mobile device 212 identifier, user 256 contact details (e.g., cellular phone number), contact details of user 256 family members or friends, user 256 home and office addresses, geo-locations of specific places (e.g., police stations, fire station, etc.), contact details of emergency service providers or authorities (e.g., police, ambulance, etc.), personal identifiable biometric information of user 256 and family members, and/or the like.

In accordance with some aspects, the VCU 206 may share a power bus with the automotive computer 204 and the vehicle access system 208, and may be configured and/or programmed to coordinate the data between vehicle 202 systems, connected servers (e.g., the server(s) 222), and other vehicles (not shown in FIG. 2) operating as part of a vehicle fleet. The VCU 206 can include or communicate with any combination of the ECUs 210, such as, for example, a Body Control Module (BCM) 224, an Engine Control Module (ECM) 226, a Transmission Control Module (TCM) 228, a telematics control unit (TCU) 230, a Driver Assistances Technologies (DAT) controller 232, etc. The VCU 206 may further include and/or communicate with a Vehicle Perception System (VPS) 234, having connectivity with and/or control of one or more vehicle sensory system(s) 236. The vehicle sensory system 236 may include one or more vehicle sensors including, but not limited to, a Radio Detection and Ranging (RADAR or "radar") sensor configured for detection and localization of objects inside and outside the vehicle 202 using radio waves, sitting area buckle sensors, a Light Detecting and Ranging (LiDAR or "lidar") sensor, door sensors, vehicle proximity sensors, etc.

In some aspects, the VCU 206 may control vehicle 202 operational aspects and implement one or more instruction sets received from the mobile devices 212, 214 (specifically the PaaK app installed on the mobile devices 212, 214), from one or more instruction sets stored in memory 220, including instructions operational as part of the vehicle access system 208.

The TCU 230 can be configured and/or programmed to provide vehicle connectivity to wireless computing systems onboard and off board the vehicle 202, and may include a Navigation (NAV) receiver 238 for receiving and processing a GPS signal, a BLE® Module (BLEM) 240, a Wi-Fi transceiver, a UWB transceiver, and/or other wireless transceivers (not shown in FIG. 2) that may be configurable for wireless communication between the vehicle 202 and other systems (e.g., the mobile devices 212, 214), computers, and modules. The TCU 230 may be disposed in communication with the ECUs 210 by way of a bus.

In one aspect, the ECUs 210 may control aspects of vehicle operation and communication using inputs from human drivers, inputs from an autonomous vehicle controller, the vehicle access system 208, and/or via wireless signal inputs received via the wireless connection(s) from other connected devices, such as the mobile devices 212, 214, the server(s) 222, among others.

The BCM 224 generally includes integration of sensors, vehicle performance indicators, and variable reactors associated with vehicle systems, and may include processor-based power distribution circuitry that can control functions associated with the vehicle body such as lights, windows, security, vehicle PaaK system/unit, vehicle interior and/or exterior camera(s), audio system(s) including microphones, speakers, door locks and access control, vehicle energy management, and various comfort controls. The BCM 224 may also operate as a gateway for bus and network interfaces to interact with remote ECUs (not shown in FIG. 2).

In some aspects, the DAT controller 232 may provide Level-1 through Level-3 automated driving and driver assistance functionality that can include, for example, active parking assistance, trailer backup assistance, adaptive cruise control, lane keeping, and/or driver status monitoring, among other features. The DAT controller 232 may also provide aspects of user and environmental inputs usable for user authentication.

In some aspects, the automotive computer 204 and/or the vehicle access system 208 may connect with an infotainment system 242 that may include a touchscreen interface portion, and may include voice recognition features, biometric identification capabilities that can identify users based on facial recognition, voice recognition, fingerprint identification, or other biological identification means. In other aspects, the infotainment system 242 may be further configured to receive user instructions via the touchscreen interface portion, and/or display notifications, navigation maps, etc. on the touchscreen interface portion.

The computing system architecture of the automotive computer 204, the VCU 206, and/or the vehicle access system 208 may omit certain computing modules. It should be readily understood that the computing environment depicted in FIG. 2 is an example of a possible implementation according to the present disclosure, and thus, it should not be considered limiting or exclusive.

In accordance with some aspects, the vehicle access system 208 may be integrated with and/or executed as part of the ECUs 210. The vehicle access system 208, regardless of whether it is integrated with the automotive computer 204 or the ECUs 210, or whether it operates as an independent computing system in the vehicle 202, may include a transceiver 244, a processor 246, a computer-readable memory 248 and a PaaK unit 250. The transceiver 244 may be configured to receive information/inputs from external devices or systems, e.g., the mobile devices 212, 214, the server 222, and/or the like. Further, the transceiver 244 may transmit notifications, information or requests to the external devices or systems.

The processor 246 and the memory 248 may be same as or similar to the processor 218 and the memory 220, respectively. Specifically, the processor 246 may utilize the memory 248 to store programs in code and/or to store data for performing aspects in accordance with the disclosure. The memory 248 may be a non-transitory computer-readable memory storing the vehicle access program code.

The memory 248 may include one or more databases, e.g., a device identifier database 252 and a user information database 254. The device identifier database 252 may store identifiers of registered/whitelisted user devices that may access the vehicle 202 functions. As described in conjunction with FIG. 1, identifiers of registered/whitelisted user devices may include hardware identifiers or MAC addresses of user devices that may be registered with the vehicle 202.

The user information database 254 may store contact details, personal identifiable biometric information, user preferences, etc. of user 256 or other users associated with the vehicle 202 (e.g., family members or friends of user 256).

In some aspects, the processor 246 may be an Artificial Intelligence (AI)-based processor that may use a neural network model (not shown) to execute vehicle access system operation. The neural network model may be stored in the memory 248. The neural network model may be a trained or unsupervised neural network model that may analyze biometric information (e.g., facial features, fingerprint, voice samples, etc.) of a vehicle occupant captured by vehicle interior cameras and/or microphones (not shown) or the infotainment system 242 and determine whether the occupant is an authorized vehicle user. For example, the neural network model may compare the captured biometric information with pre-stored personal identifiable biometric information (that may be stored in the memory 220, the user information database 254 and/or the server 222) of authorized vehicle 202 users and determine whether the occupant is an authorized vehicle user.

In one or more aspects, the neural network model may include electronic data, which may be implemented, for example, as a software component, and may rely on code databases, libraries, scripts, or other logic or instructions for execution of a neural network algorithm by the processor 246. The neural network model may be implemented as code and routines configured to enable a computing device, such as the vehicle access system 208, to perform one or more operations. In some aspects, the neural network model may be implemented using hardware including a processor, a microprocessor, a field-programmable gate array (FPGA), or an application-specific integrated circuit (ASIC). In other aspects, the neural network model may be implemented by using a combination of hardware and software.

Examples of the neural network model may include, but are not limited to, a deep neural network (DNN), a convolutional neural network (CNN), a recurrent neural network (RNN), a CNN-recurrent neural network (CNN-RNN), R-CNN, Fast R-CNN, Faster R-CNN, an artificial neural network (ANN), a Long Short Term Memory (LSTM) network based RNN, CNN+ANN, LSTM+ANN, a gated recurrent unit (GRU)-based RNN, a fully connected neural network, a deep Bayesian neural network, a Generative Adversarial Network (GAN), and/or a combination of such networks. In some aspects, the neural network model may include numerical computation techniques using data flow graphs. In one or more aspects, the neural network model may be based on a hybrid architecture of multiple Deep Neural Networks (DNNs).

In some aspects, the PaaK unit 250 may determine and monitor a location of a PaaK-enabled mobile device or a mobile device installed with the PaaK app (e.g., the mobile devices 212, 214) relative to vehicle 202 location to time broadcasting a pre-authentication message to the mobile devices 212, 214. As the mobile devices 212, 214 approach a predetermined communication range relative to the vehicle 202 location, the mobile devices 212, 214 may transmit a preliminary response message (e.g., a "vehicle access request") corresponding to the pre-authentication message to the PaaK unit 250. The preliminary response message may include, for example, the mobile device 212, 214 identifiers and/or contact numbers. The PaaK unit 250 may send the obtained mobile device 212, 214 identifiers and/or contact numbers to the processor 246 to accept or reject vehicle 202 access to users associated with the mobile devices 212, 214. The operation of the vehicle access system 208 (and other vehicle 202 units) in accepting or rejecting vehicle 202 access may be understood as follows.

When the user 256 accesses the vehicle 202 for the first time using the PaaK app installed on the mobile device 212, the PaaK unit 250 may exchange one or more authentication tokens with the mobile device 212, as described in conjunction with FIG. 1. The PaaK unit 250 may further obtain the mobile device 212 identifier and contact number. The PaaK unit 250 may send the obtained mobile device 212 identifier and contact number to the device identifier database 252 and the server 222 for storage purpose. The mobile device 212 may be "registered" with the vehicle 202, when the mobile device 212 identifier and contact number are stored in the device identifier database 252 and the server 222. Stated another way, the PaaK unit 250 may whitelist the mobile device 212 to access the vehicle 202 features, when the mobile device 212 identifier and contact number are stored in the device identifier database 252 and the server 222.

As described in conjunction with FIG. 1, the user 256 may further set and enable passcode/password authentication, so that whenever a user attempts to access the vehicle 202 features, the user may be required to input the passcode/password on the mobile device 212 and/or the infotainment system 242.

In further aspects, the PaaK unit 250 (or the processor 246) may obtain the user 256 personal identifiable biometric information. As described in conjunction with FIG. 1, the user 256 personal identifiable biometric information may include user's facial features, fingerprint, iris identification information, voice signature, etc. The PaaK unit 250 may send the obtained user 256 personal identifiable biometric information to the user information database 254 and/or the server 222 for storage purpose. The biometric authentication may provide additional security to the vehicle 202 and may prevent unauthorized users from accessing the vehicle 202 features, as described in conjunction with FIG. 1.

In operation, when a user (e.g., a user 258) associated with the mobile device 214 approaches in proximity to the vehicle 202, the user 258 may send a vehicle 202 access request via the mobile device 214 to the vehicle 202. The vehicle 202 access request may include, for example, mobile device 214 identifier and contact number. The PaaK unit 250 may receive the vehicle 202 access request and send the mobile device 214 identifier and contact number to the processor 246.

Responsive to receiving the mobile device 214 identifier and contact number, the processor 246 may fetch identifier(s) of user device(s) (e.g., the mobile device 212) registered with the vehicle 202 from the device identifier database 252. The processor 246 may compare the mobile device 214 identifier with the fetched identifiers, and determine whether the mobile device 214 is a registered user device. The processor 246 may grant the vehicle 202 access to the user 258, when the processor 246 determines that the mobile device 214 is a registered user device. For example, the processor 246 may transmit a control signal to the BCM 224 to open a vehicle 202 driver door when the user 258 approaches near the vehicle 202 driver door, and/or to the ECM 226 to enable access to the vehicle 202 engine when the processor 246 grants access to the user 258. In addition, the processor 246 may perform passcode/password and/or biometric authentication for the user 258, based on user 256 vehicle security preferences (that may be stored in the user information database 254).

On the other hand, the processor 246 may not grant the vehicle 202 access to the user 258 when the processor 246 determines that the mobile device 214 is an unregistered user device, i.e., not registered with the vehicle 202. In this case, the processor 246 may transmit, via the transceiver 244, a first authentication request to the mobile device 212. The first authentication request may include, for example, the mobile device 214 identifier and contact number.

Responsive to receiving the first authentication request on the mobile device 212, the user 256 may accept or reject the first authentication request. Stated another way, the user 256 may approve (or disprove) the user 258 to access the vehicle 202 features by viewing the mobile device 214 identifier and/or contact number.

The mobile device 212 may transmit a first authentication response to the transceiver 244 in response to the first authentication request. In a scenario where the user 256 accepts the first authentication request (i.e., grants a "first level" vehicle 202 access), the first authentication response may include vehicle 202 access credentials (e.g., the passcode/password) that the user 258 may use to access the vehicle 202 functions. In other aspects, the first authentication response may not include the vehicle 202 access credentials and may only include an indication that the user 256 has accepted the first authentication request.

The transceiver 244 may send the received first authentication response to the processor 246. Responsive to receiving the first authentication response, in some aspects, the processor 246 may send a control signal to the BCM 224 to cause one or more vehicle exterior lights (e.g., vehicle parking lights) to blink or illuminate a predetermined time (e.g., two or three times). Vehicle exterior light blinking may provide an indication to the user 258 that the vehicle 202 access request is granted. In addition, the processor 246 may send a notification, via the transceiver 244, to the mobile device 214 indicating vehicle 202 access request grant status. In some aspects, the notification may additionally include the vehicle 202 access credentials.

In the scenario described above, the processor 246 may additionally send a control signal to the BCM 224 to unlock the vehicle 202 driver door (or any other vehicle door) when the user 258 approaches a predefined distance near to the vehicle 202. Stated another way, the processor 246 may cause the vehicle 202 driver door to unlock when the user 258 is near the vehicle 202 and may not unlock the door when the user 258 is far. In some aspects, the processor 246 may determine user 258 distance from the vehicle 202 by using one or more vehicle sensors (e.g., exterior vehicle radar sensors, BLE, UWB, etc.) from the vehicle sensory system 236.

Responsive to vehicle 202 door unlocking, the user 258 may enter a vehicle 202 interior portion (e.g., enter a driver sitting area). In some aspects, the processor 246 may not enable access to vehicle 202 engine or switch ON the vehicle 202 engine when the user 258 enters the vehicle 202 interior portion. The processor 246 may send a control signal to the BCM 224 to activate one or more vehicle interior cameras to capture user 258 images/videos when the user 258 enters the vehicle 202 interior portion and/or when the vehicle 202 door opens. For example, a vehicle front interior camera may capture user 258 face image when the user 258 sits in the driver sitting area.

Responsive to capturing the user 258 image, the vehicle interior camera may send the user 258 image to the processor 246, and the processor 246 may send (via the transceiver 244) a second authentication request to the mobile device 212 in response to receiving the user 258 image. The second authentication request may include the user 258 image. In addition, the processor 246 may send the captured user 258 image to the memory 220, 248 for storage purpose.

Responsive to receiving the second authentication request on the mobile device 212, the user 256 may grant a second level vehicle 202 access to the user 258 by viewing the user 258 image. In this case, the mobile device 212 may send a second authentication response to the transceiver 244 in response to the second authentication request. The transceiver 244 may send the second authentication response to the processor 246.

The processor 246 may enable access to the vehicle 202 engine or switch ON the vehicle 202 engine when the second authentication response indicates that the user 256 has accepted the second authentication request. In this manner, the present disclosure implements two-factor authentication (by using the first and second authentication requests) to allow authorized users to access the vehicle 202 functions (e.g., access vehicle 202 doors and/or the vehicle 202 engine).

In the scenario described above, the processor 246 may further store the mobile device 214 identifier and contact detail in the device identifier database 252 as a registered or whitelisted identifier/contact number. In this case, when the mobile device 214 attempts to access the vehicle 202 functions again (e.g., a subsequent time in a future), the vehicle access system 208 may not send first/second authentication requests to the mobile device 212.

In some aspects, the user 256 may grant the vehicle 202 access for a predefined time duration, e.g., 2 hours or 24 hours. For example, the user 256 may grant access for 2 hours when the mobile device 214 is associated with a valet service provider and may grant access for 24 hours when the mobile device 214 is associated with a car rental firm. In this case, the mobile device 212 may add the predefined time duration for the vehicle 202 access to the first or the second authentication response. The processor 246 may grant access to the vehicle 202 functions for the predefined time duration included in the first or the second authentication response.

Figure 3:
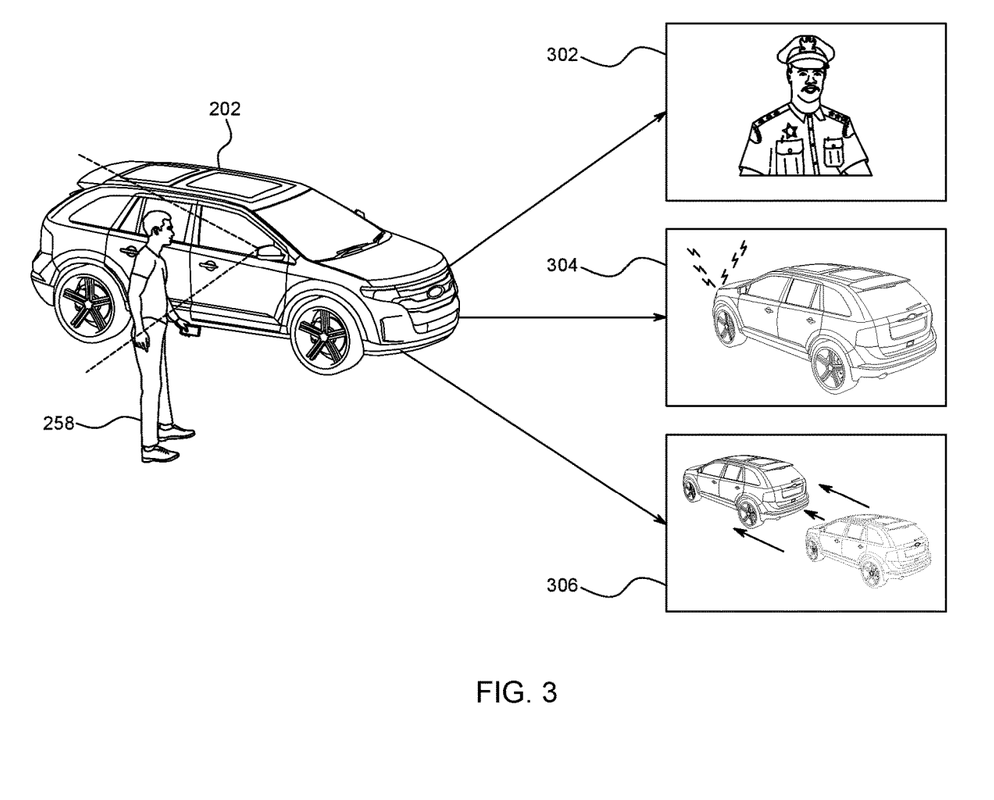
FIG. 3 depicts example embodiments of vehicle security control actions in accordance with the present disclosure.

In a scenario where the user 256 rejects the second authentication request after viewing the user 258 image, the processor 246 may activate one or more vehicle 202 security features/units to perform one or more security control actions. Examples of vehicle 202 security control actions are shown in FIG. 3 and described later in the description below.

As described above, the processor 246 may cause one or more vehicle exterior lights (e.g., the vehicle parking lights) to blink or illuminate a predetermined times when the user 256 accepts the first authentication request. In some aspects, the processor 246 may cause the vehicle exterior lights to blink even when the user 256 rejects the first authentication request. In this case, the user 258 may still come close to or in vicinity of the vehicle 202 (with the assumption that the user 256 may have approved the first authentication request).

When the user 258 is in vehicle 202 vicinity, the processor 246 may send a control signal to the BCM 224 to activate one or more vehicle exterior cameras and capture the user 258 images/videos. In some aspects, the processor 246 may activate the vehicle exterior cameras when the user 258 is in a field of view (FOV) of the vehicle exterior cameras.

Responsive to capturing the user 258 images/videos, the exterior cameras may send the images/videos to the processor 246 (and to the memory 220, 248 for storage purpose). In some aspects, the processor 246 may then send the second authentication request to the mobile device 212 in response to the exterior cameras capturing the user 258 images/videos. In this case, the second authentication request may include the user 258 images/videos captured by the exterior cameras. Responsive to viewing the user 258 images/videos on the mobile device 212, the user 256 may approve first and second level vehicle 202 access for the user 258. Alternatively, the user 256 may disprove the second authentication request responsive to viewing the user 258 images/videos. In the latter case, the processor 246 may activate the vehicle 202 security features/units.

In alternative aspects, the processor 246 may not send the second authentication request including the user 258 images/videos captured by the vehicle exterior cameras to the mobile device 212 and may directly activate the vehicle 202 security features/units when the exterior cameras capture the user 258 images/videos.

The processor 246 may activate the vehicle 202 security features/units to perform one or more security control actions associated with the vehicle 202. FIG. 3 depicts example embodiments of vehicle 202 security control actions in accordance with the present disclosure.

In one aspect, the processor 246 may initiate a call, via the TCU 230, with authorities, e.g., police 302. In this case, the processor 246 may additionally send the captured user 258 images/videos to the police 302.

In another aspect, the processor 246 may additionally initiate a vehicle alarm system 304 that may cause the vehicle 202 to visually and/or audibly alarm users/people near the vehicle 202, indicating that an unauthorized user may be attempting to access the vehicle 202.

In yet another aspect, the processor 246 may send a control signal to the DAT controller 232 and cause the vehicle 202 to automatically start to move (as shown in view 306) towards a nearest police station. In some aspects, locations of police stations may be stored in the server 222, and the processor 246 may first fetch the locations and then cause the vehicle 202 to move towards the nearest police station.

A person ordinarily skilled in the art may appreciate that there may be additional vehicle 202 security control actions that the processor 246 may perform, and the three examples depicted in FIG. 3 should not be construed as limiting the present disclosure scope.

Figure 4:
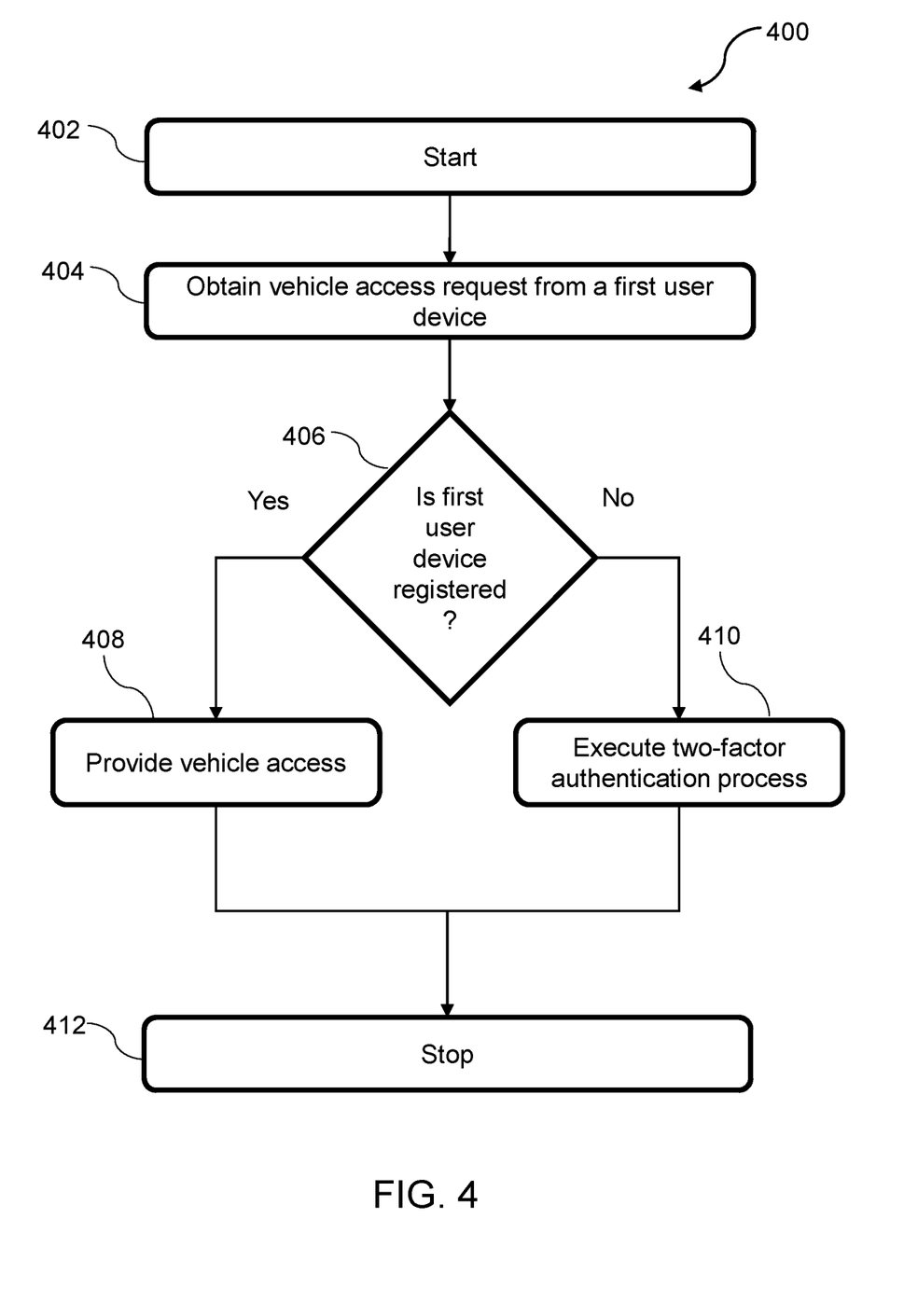
FIG. 4 depicts a flow diagram of an example first method for managing vehicle access in accordance with the present disclosure.

FIG. 4 depicts a flow diagram of an example first method 400 for managing vehicle access in accordance with the present disclosure. FIG. 4 may be described with continued reference to prior figures, including FIGS. 1-3. The following process is exemplary and not confined to the steps described hereafter. Moreover, alternative embodiments may include more or less steps that are shown or described herein and may include these steps in a different order than the order described in the following example embodiments.

Referring to FIG. 4, at step 402, the method 400 may commence. At step 404, the method 400 may include obtaining, by the processor 246, the vehicle 202 access request from the mobile device 214. As described in conjunction with FIG. 2, the user 258 may send the vehicle 202 access request via the PaaK app installed on the mobile device 214. The vehicle 202 access request may include the mobile device 214 identifier and contact number. Responsive to receiving the mobile device 214 identifier, the processor 246 may determine whether the mobile device 214 is a registered user/mobile device with the vehicle 202, at step 406.

At step 408, the method 400 may include providing, by the processor 246, the vehicle 202 access to the user 258 when the mobile device 214 is a registered mobile device with the vehicle 202.

At step 410, the method 400 may include executing, by the processor 246, a two-factor authentication process when the mobile device 214 is not a registered mobile device with the vehicle 202. The two-factor authentication process is described above in conjunction with FIGS. 2 and 3, and also described below in conjunction with FIG. 5.

At step 412, the method 400 may stop.

Figure 5:
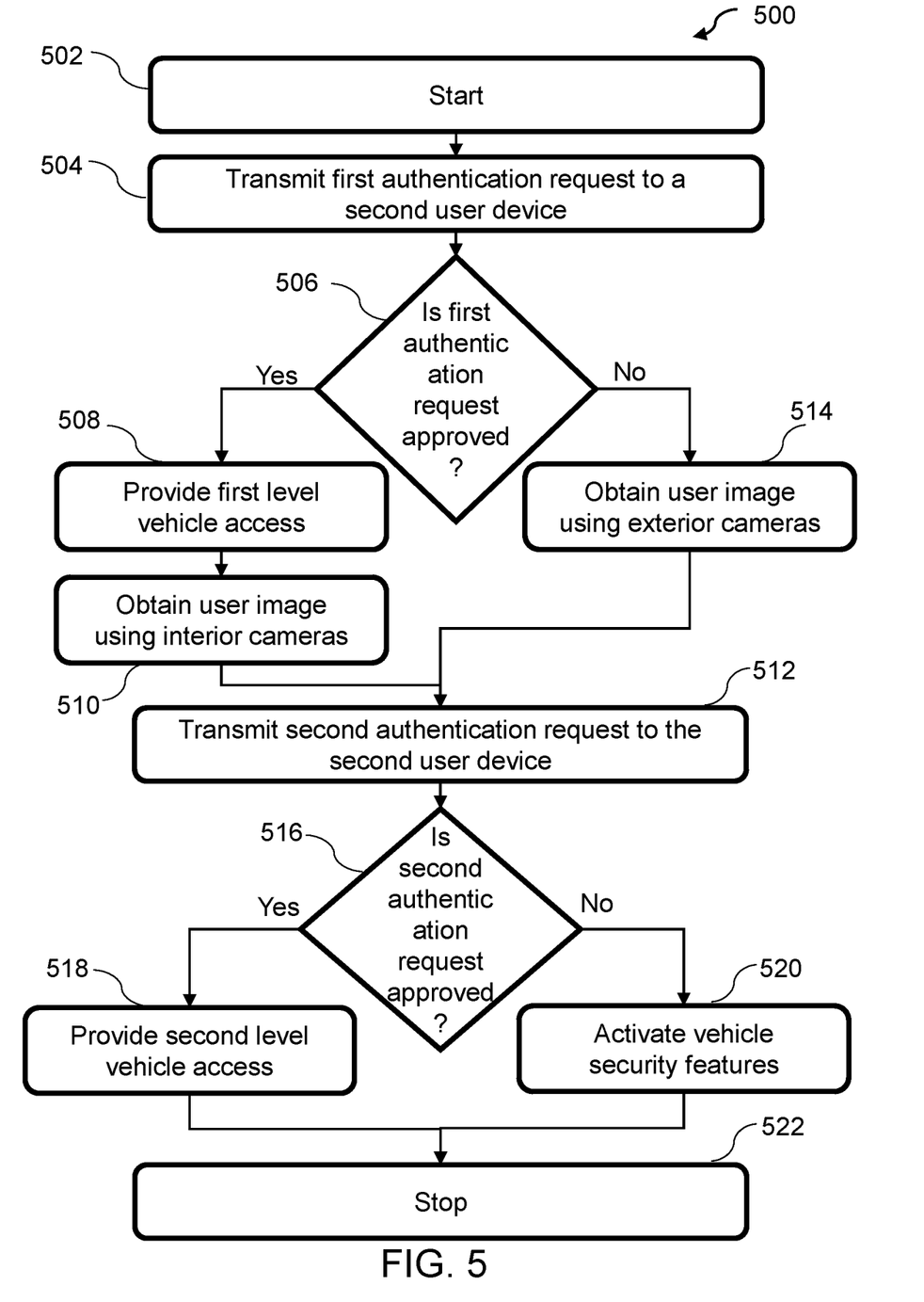
FIG. 5 depicts a flow diagram of an example second method for managing vehicle access in accordance with the present disclosure.

FIG. 5 depicts a flow diagram of an example second method 500 for managing vehicle access in accordance with the present disclosure. Specifically, FIG. 5 depicts the flow diagram of the method 500 that is associated with the two-factor authentication process mentioned above in conjunction with FIG. 4.

FIG. 5 may be described with continued reference to prior figures, including FIGS. 1-4. The following process is exemplary and not confined to the steps described hereafter. Moreover, alternative embodiments may include more or less steps that are shown or described herein and may include these steps in a different order than the order described in the following example embodiments.

At step 502, the method 500 may commence. At step 504, the method 500 may include transmitting, by the processor 246 (via the transceiver 244), a first authentication request to the mobile device 212. In some aspects, the processor may transmit the first authentication request when the processor 246 determines that the mobile device 214 is not a registered mobile device with the vehicle 202.

At step 506, the method 500 may include determining, by the processor 246, whether the user 256 has approved/accepted the first authentication request. At step 508, the method 500 may include providing, by the processor 246, the first level vehicle 202 access to the user 258 when the user 256 approves/accepts the first authentication request. As described in conjunction with FIG. 2, providing the first level vehicle 202 access may include providing access to the vehicle 202 interior portion by unlocking the vehicle 202 door.

Responsive to vehicle 202 door unlocking, the user 258 may enter the vehicle 202 interior portion. At step 510, the method 500 may include obtaining, by the processor 246, user 258 images/videos by using the vehicle interior cameras.

At step 512, the method 500 may include transmitting, by the processor 246 (via the transceiver 244), a second authentication request to the mobile device 212. In some aspects, the second authentication request may include the user 258 images/videos.

When the processor 246 determines, at the step 506, that the user 256 has not approved/accepted the first authentication request, the method 500 may move to step 514. At step 514, the method 500 may include obtaining, by the processor 246, the user 258 images/videos by using the vehicle exterior cameras. The method 500 moves to the step 512 after the processor 246 obtains the user 258 images/videos by using the vehicle exterior cameras.

At step 516, the method 500 may include determining, by the processor 246, whether the second authentication request is approved/accepted by the user 256. When the processor 246 determines that the user 256 has approved the second authentication request, the processor 246 may provide the second level vehicle 202 access (and the first level vehicle 202 access if the user 256 rejected the first authentication request at the step 506) to the user 258, at step 518. The second level vehicle 202 access may include access to the vehicle 202 engine or switching ON of the vehicle 202 engine.

On the other hand, the processor 246 may activate the vehicle 202 security features/units at step 520, when the processor 246 determines at step 516 that the user 256 has rejected the second authentication request.

The method 500 ends at step 522.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "May," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for managing vehicle access, the method comprising:
   receiving, by a processor of a vehicle, a request to access the vehicle from a first user device, wherein the first device is not registered with the vehicle;
   transmitting, by the processor of the vehicle, a first authentication request to a second user device, wherein the second user device is registered with the vehicle;
   receiving, by the processor of the vehicle, a first authentication response from the second user device in response to first authentication request;
   outputting, by the processor of the vehicle, a first control signal to a first vehicle unit of the vehicle, based on the first authentication response, the first control signal granting access to a first level associated with the vehicle;
   determining, by the processor of the vehicle, that a user associated with the first user device has entered the vehicle;
   causing, by the processor of the vehicle, a camera of the vehicle to capture an image of the first user; and
   granting, by the processor of the vehicle and based on the second image, access to a second level of the vehicle.

2. The method of claim 1, wherein the first authentication request comprises a first user device identifier.

3. The method of claim 1, wherein the first vehicle unit is a vehicle door, and wherein outputting the first control signal to the first vehicle unit comprises outputting the first control signal to the vehicle door to unlock the vehicle door.

4. The method of claim 3, wherein outputting the first control signal to the vehicle door comprising outputting the first control signal when a distance between the first user device and the vehicle door is less than a predefined threshold.

5. The method of claim 3, wherein causing the camera of the vehicle to capture an image of the first user further comprising:
    outputting a second control signal to the camera to activate the camera responsive to unlocking the vehicle door, wherein the camera is located in an interior of the vehicle; and
    receiving the first image of the first user from the camera;
wherein granting access to the second level further comprises:
    transmitting a second authentication request to the second user device, wherein the second authentication request comprises the first image;
    receiving a second authentication response from the second user device in response to second authentication request; and
    outputting a third control signal to a second vehicle unit based on the second authentication response.

6. The method of claim 5, wherein the second vehicle unit is a vehicle ignition, and wherein outputting the third control signal to the second vehicle unit comprises outputting the third control signal to the vehicle ignition to enable access to the vehicle ignition.

7. A vehicle comprising:
    a transceiver;
    a processor communicatively coupled with the transceiver; and
    a memory for storing executable instructions, the processor programmed to execute instructions to:
    receive, from the transceiver, a first request from a first user device to access the vehicle, the first user device being associated with a first user;
    determine whether the first user device is a registered user device,
    transmit, using the transceiver, a first authentication request to a second user device based on a determination that the first user device is unregistered, wherein the second user device is associated with a second user and is registered with the vehicle;
    receive, using the transceiver, a first authentication response from the second user device in response to first authentication request transmission;
    output a first control signal to a first vehicle unit based on the first authentication response, wherein the first authentication response grants a first level access to the vehicle;
    determine that the first user is inside the vehicle;
    output a second control signal to a vehicle interior camera to activate the vehicle interior camera;
    obtain a first image of the first user using the vehicle interior camera;
    transmit a second authentication request to the second user device, wherein the second authentication request comprises the first image;
    obtain a second authentication response from the second user device in response to second authentication request; and
    output a third control signal to a second vehicle unit based on the second authentication response, wherein the second authentication response grants a second level access to the vehicle.

8. The vehicle of claim 7, wherein the first authentication request comprises a first user device identifier associated with the first user device.

9. The vehicle of claim 7, wherein the first vehicle unit is a vehicle door, and wherein the processor outputs the first control signal to the vehicle door to unlock the vehicle door, based on a determination that the first level access is accepted.

10. The vehicle of claim 7, wherein the second vehicle unit is a vehicle ignition, and the processor outputs the third control signal to the vehicle ignition to enable the access to the vehicle ignition.

11. The vehicle of claim 7, wherein the first vehicle unit is a vehicle exterior camera, and the processor outputs the first control signal to the vehicle exterior camera to activate the vehicle exterior camera, based on a determination that the authentication request is rejected.

12. A method comprising:
    receiving, by a processor of a vehicle, a first authentication request from a first user device associated with a first user;
    determining, by the processor of the vehicle, that the first user device is not authorized to access the vehicle;
    sending, by the processor of the vehicle and to a second user device, first authentication request associated with the first user device, the second user device being preregistered with the vehicle;
    receiving, by the processor of the vehicle, a first response from the second user device denying the first authentication request;
    in response to the denial of the first authentication request, activating, by the processor of the vehicle, an exterior camera of the vehicle;
    causing, by the processor of the vehicle, the exterior camera to capture an image of the first user;
    sending, by the processor of the vehicle and to the second user device, a second authentication request including the image of the first user;
    receiving, by the process of the vehicle, a second response from the second user device denying the second authentication request; and
    in response to the denial of the second authentication request, activating, by the processor of the vehicle, one or more security features of the vehicle.

13. The method of claim 12, wherein the first authentication request includes information identifying the first user device.

14. The method of claim 12, wherein the second user device is associated with a second user and wherein the second user is an owner of the vehicle.

15. The method of claim 12, wherein activating the one or more security features includes one or more of:
    contacting, by the processor of the vehicle, one or more law enforcement agencies;
    activating a vehicle alarm system; or
    autonomously moving the vehicle toward a nearest police station.

* * * * *